United States Patent [19]

Manzoni

[11] Patent Number: 4,705,368
[45] Date of Patent: Nov. 10, 1987

[54] ANTI-VIBRATION DEVICE FOR VEHICLE REARVIEW MIRROR

[75] Inventor: Stéphane Manzoni, Saint-Claude, France

[73] Assignee: Manzoni-Bouchot, France

[21] Appl. No.: 830,222

[22] Filed: Feb. 18, 1986

[30] Foreign Application Priority Data

Feb. 22, 1985 [FR] France .................. 85 02580

[51] Int. Cl.⁴ .................. B60R 1/02; G02B 7/18
[52] U.S. Cl. .................. 350/632; 350/636; 248/466
[58] Field of Search ........... 350/632, 636, 631, 634; 248/466, 469, 622, 618

[56] References Cited

U.S. PATENT DOCUMENTS 3,972,597 8/1976 Repay et al. .................. 350/634
4,506,954 3/1985 Enomoto .................. 350/634

FOREIGN PATENT DOCUMENTS 99216 7/1983 European Pat. Off. ........... 350/632
3206754 9/1983 Fed. Rep. of Germany ...... 350/632

Primary Examiner—Jon W. Henry
Attorney, Agent, or Firm—Remy J. VanOphem

[57] ABSTRACT

An anti-vibration device for a rearview mirror mounted for pivoting about two perpendicular axes inside a housing fixed on the bodywork of a vehicle. The support of the mirror has, on its rear face, a boss which extends perpendicularly to the face and which is engaged between two elastic branches of a dampening member mounted for free sliding on the bottom of the housing along an axis substantially perpendicular to the axis of the boss.

7 Claims, 4 Drawing Figures

ANTI-VIBRATION DEVICE FOR VEHICLE REARVIEW MIRROR

The present invention relates to an anti-vibration device for a vehicle rearview mirror.

Rearview mirrors in which the mirror proper is angularly movable inside its support case and controllable from outside or inside the vehicle, have one disadvantage in that, when the mirror is subjected to extraneous vibrations, it can give a blurred or "flickering" image, which impairs the driver's vision.

The devices currently proposed to eliminate vibrations generally consist of elastic members situated between the mirror-holder and the mirror housing. Such anti-vibration devices are constructed using either torsional stress-absorbing pins or compression or friction absorbing blades or plates.

Generally, these anti-vibration devices are composed of a flexible element adapted to come in sliding contact with the inner surface of a spring plate, and another element which is firmly secured to the back of the mirror-supporting member.

These devices are efficient in rearview mirrors where the mirror moves inside its housing without the edge of the mirror projecting from the external periphery of the housing.

With certain types of rearview mirrors, however, a condition exists where the mirror, in its extreme travel positions, protrudes from the periphery of the housing, in which case the elastic member stops being in contact with the inner wall of the housing and the mirror no longer exhibits anti-vibration features.

It is the object of the present invention to propose an anti-vibration device which eliminates the aforesaid drawbacks.

SUMMARY OF THE INVENTION

According to the invention, the mirror support is provided on its back face with a boss extending perpendicularly to the back face. The boss is engaged between two elastic branches of a dampening member mounted for free sliding engagement on the bottom of the housing, along an axis substantially perpendicular to the axis of the boss.

The device according to the invention, of very simple design, keeps the mirror perfectly stable, so that a correct image is always obtained even when the mirror protrudes beyond the edges of the housing in any of its extreme positions.

BRIEF DESCRIPTION OF THE DRAWINGS

The invention will be more readily understood on reading the following description with reference to the accompanying drawings in which.

DETAILED DESCRIPTION OF THE PREFERRED EMBODIMENT

Figure 1:
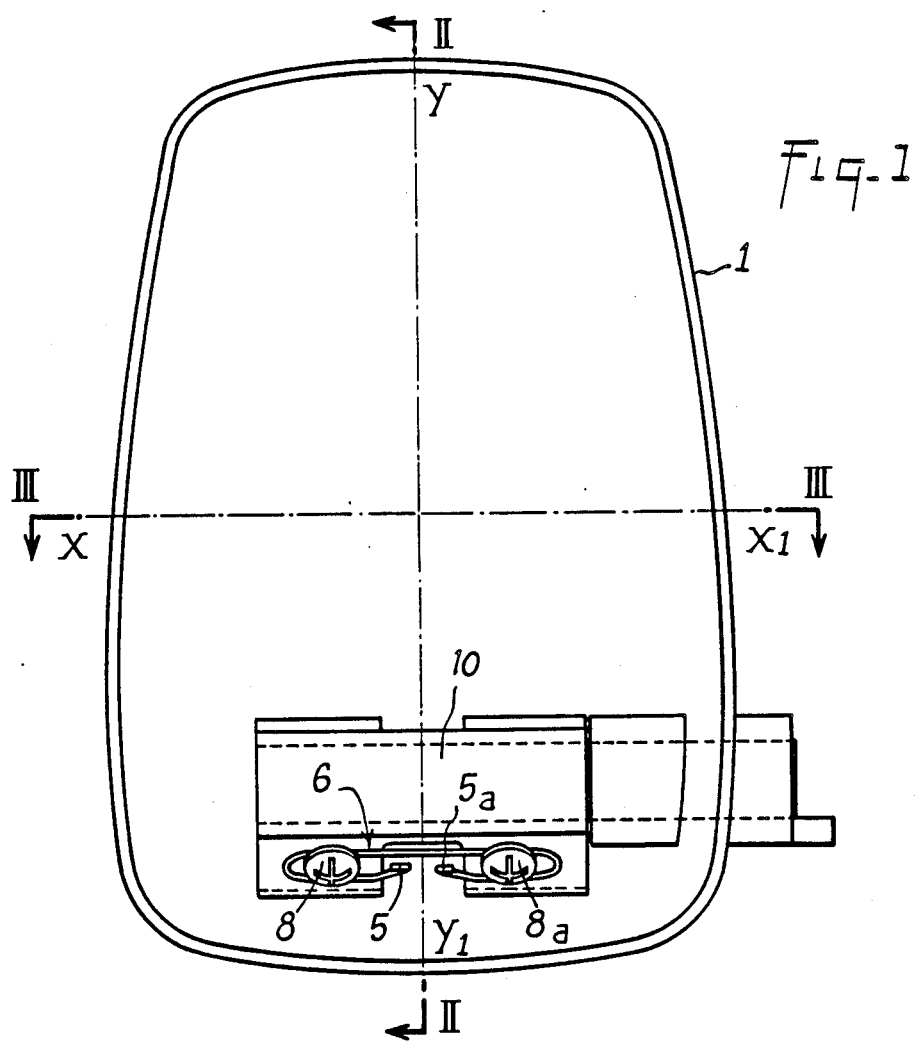
FIG. 1 is a front elevational view of a rearview mirror, with the mirror removed, equipped with the anti-vibration device according to the invention.
Figure 3:
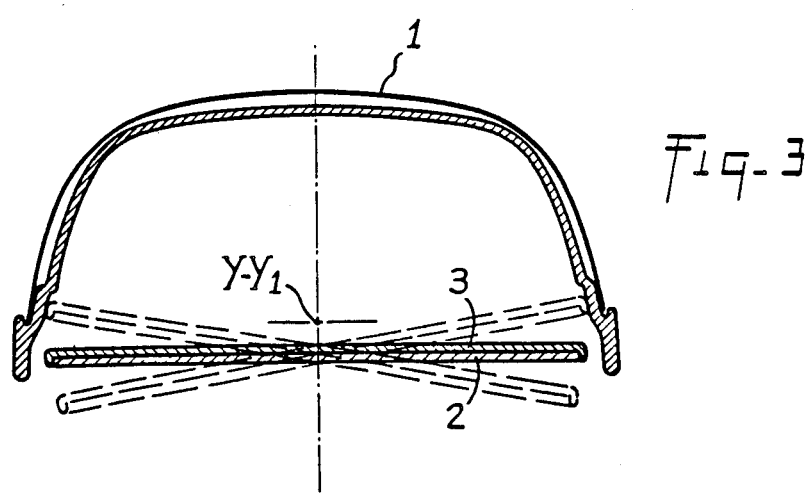
FIG. 3 is a cross-sectional view of the rearview mirror, taken along line III—III of FIG. 1.
Figure 2:
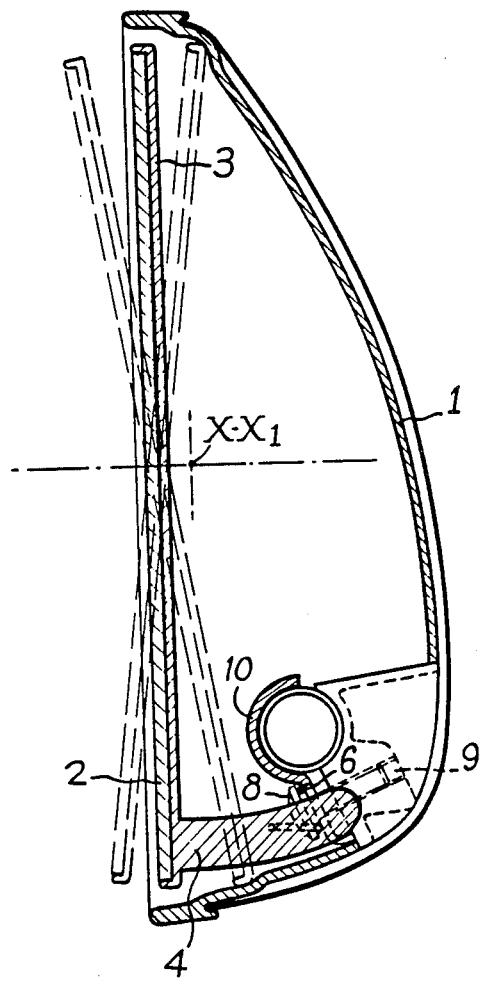
FIG. 2 is a cross-sectional view of the rearview mirror, taken along line II—II of FIG. 1, the mirror being inside the housing.

Referring now to FIGS. 1, 2 and 3, there is shown a rearview mirror housing 1, in which a mirror 2 is mounted for pivoting about two perpendicular axes $XX_1$ and $YY_1$. The mirror 2 is mounted on a support plate 3 connected, in a known manner, to a remote control means, not shown in the drawings, the remote control means permitting the orientation of the mirror 2 in any direction. A boss constructed of a curved plate 4, which extends perpendicular to the surface of the support plate, is provided at the base of the support plate 3. The said curved plate 4 engages the elastic branches 5, 5a of a dampening member 6 assembled integral with the bottom of the housing 1.

The dampening member 6 is approximately safety pin-shaped and made of steel wire (FIGS. 1 and 2) and is constructed of two looped portions 7, 7a which are mounted for sliding over the stems of two screws 8, 8a (FIGS. 1 and 2), screwed into tapped holes 9 provided in the wall of the housing.

Figure 4:
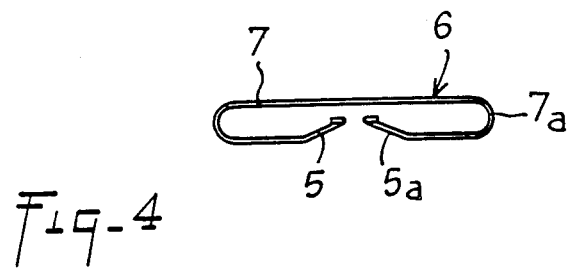
FIG. 4 is an elevational view of the dampening member or pin.

A metal plate 10 is mounted between the bottom of the housing 1 and the dampening member 6, against which plate the dampening member moves. The looped portions 7, 7a of the dampening member or pin 6 are joined together on one side, with the elastic branches 5, 5a being provided on the other side (FIG. 4), which branches are bent to provide access for the boss 4 which is engaged in the space provided between the branches 5, 5a of the pin 6.

Thus, the dampening member or pin 6 is mounted for sliding freely on the screws 8, 8a along an axis parallel to the axis $XX_1$ and perpendicular to boss 4. When the mirror moves about axis $YY_1$, the boss 4 moves with the pin 6, while remaining tightly gripped between the branches 5, 5a which hold the entire assembly in order to prevent all vibrations of the mirror. When the mirror moves along axis $XX_1$, the boss 4 can slide back and forth between the branches 5, 5a of the dampening member 6, while remaining gripped between the branches 5, 5a which hold the entire assembly in order to prevent the mirror from vibrating. Thus, in any position of the mirror 2, the mirror is held positively to avoid any and to all vibrations.

What is claimed is:

1. In combination with a rearview mirror device of the type having a housing mounted to a vehicle, a reflective member, and support means for supporting said reflective member, said support means having a rear face and being pivotally mounted to said housing for pivoting said reflective member about two perpendicular axes, wherein the improvement comprises:

a dampening member slidingly mounted to said housing, said dampening member having a base portion and at least one resilient branch portion extending from said base portion; and a boss portion extending perpendicular to said rear face of said support means in a direction towards said dampening member, said boss portion engaging said at least one resilient branch portion of said dampening member, said base portion being slidably mounted to said housing along an axis substantially perpendicular to said boss portion.

2. The combination as claimed in claim 4, wherein said boss portion is placed at the lower part of said support means and further comprises a flat plate mating with said at least one resilient branch portion of said dampening member.

3. The combination as claimed in claim 4 further comprising means for slidably mounting said dampening member to said housing, said means for slidably mounting said dampening member having at least one adjustable screw member mounted to said housing along said axis substantially perpendicular to said boss portion such that said at least one adjustable screw member slidably engages said base portion of said dampening member to permit sliding movement of said dampening member as said support means pivots about one of said two perpendicular axes; and wherein said base portion of said dampening member comprises a double ended looped wire having at least one looped portion, said at least one looped portion being mounted for sliding on said at least one adjustable screw member, said at least one resilient branch portion of said dampening member further having two elastic branches defining a space between them, said boss portion engaging said two elastic branches within said defined space of said resilient branch portion of said dampening member.

4. An anti-vibration device adapted for mounting between the rear face of a mirror support and a vehicle rearview mirror housing, said anti-vibration device comprising:

a dampening member slidingly mounted to said vehicle rearview mirror housing, said dampening member having a base portion and at least one resilient branch portion extending from said base portion; and a boss portion extending perpendicular to said rear face of said mirror support in a direction towards said dampening member, said boss portion engaging said at least one resilient branch portion of said dampening member, said base portion being slidably mounted to said rearview mirror housing along an axis substantially perpendicular to said boss portion.

5. The anti-vibration device as claimed in claim 4 wherein said boss portion is placed at the lower part of said mirror support and further comprises a flat plate mating with said at least one resilient branch portion of said dampening member.

6. The anti-vibration device as claimed in claim 4 further comprising means for slidably mounting said dampening member to said housing, said means for slidably mounting said dampening member having at least one adjustable screw member mounted to said housing along said axis substantially perpendicular to said boss portion such that said at least one adjustable screw member slidably engages said base portion of said dampening member to permit sliding movement of said dampening member as said mirror support pivots about one of said two perpendicular axes; and wherein said base portion of said dampening member comprises a double ended looped resilient wire having at least one looped portion, said at least one looped portion being mounted for sliding on said at least one adjustable screw member, said at least one resilient branch portion of said dampening member further having two elastic branches defining a space between them, said boss portion engaging said two elastic branches within said defined space of said resilient branch portion of said dampening member.

7. The anti-vibration device as claimed in claim 5 further comprising means for slidably mounting said dampening member to said housing, said means for slidably mounting said dampening member having at least two screw members mounted to said housing in spaced relationship along said axis substantially perpendicular to said boss portion such that said at least two screw members slidably engage said base portion of said dampening member to permit sliding movement of said dampening member as said mirror support pivots about one of said two perpendicular axes; and wherein said base portion of said dampening member comprises a double ended looped wire having opposing looped portions at each respective end of said double ended looped wire, each of said opposing looped portions being mounted to a respective one of said at least two screw members for sliding movement relative thereto, said at least resilient branch portion of said dampening member further having two elastic branches defining a space between them, said space being defined between said two ends of said double ended looped wire, said boss portion engaging said two ends of said double ended looped wire within said defined space of said at least one resilient branch portion of said dampening member to bias said boss portion as said mirror support pivots about said two perpendicular axes.

* * * * *

UNITED STATES PATENT AND TRADEMARK OFFICE
CERTIFICATE OF CORRECTION

PATENT NO. : 4,705,368

DATED : November 10, 1987

INVENTOR(S) : Stephane Manzoni

It is certified that error appears in the above-identified patent and that said Letters Patent is hereby corrected as shown below:

Column 1, before line 5, insert ---- BACKGROUND OF THE INVENTION ----.

Column 2, line 13, delete "said".

Column 2, line 33, after "to" insert ---- the ----.

Column 2, line 44, before "all", delete "to".

Column 4, line 38, after "least" insert ---- one ----.

Signed and Sealed this

Seventeenth Day of May, 1988

Attest:

DONALD J. QUIGG

Attesting Officer

Commissioner of Patents and Trademarks